United States Patent Office 2,826,825
Patented Mar. 18, 1958

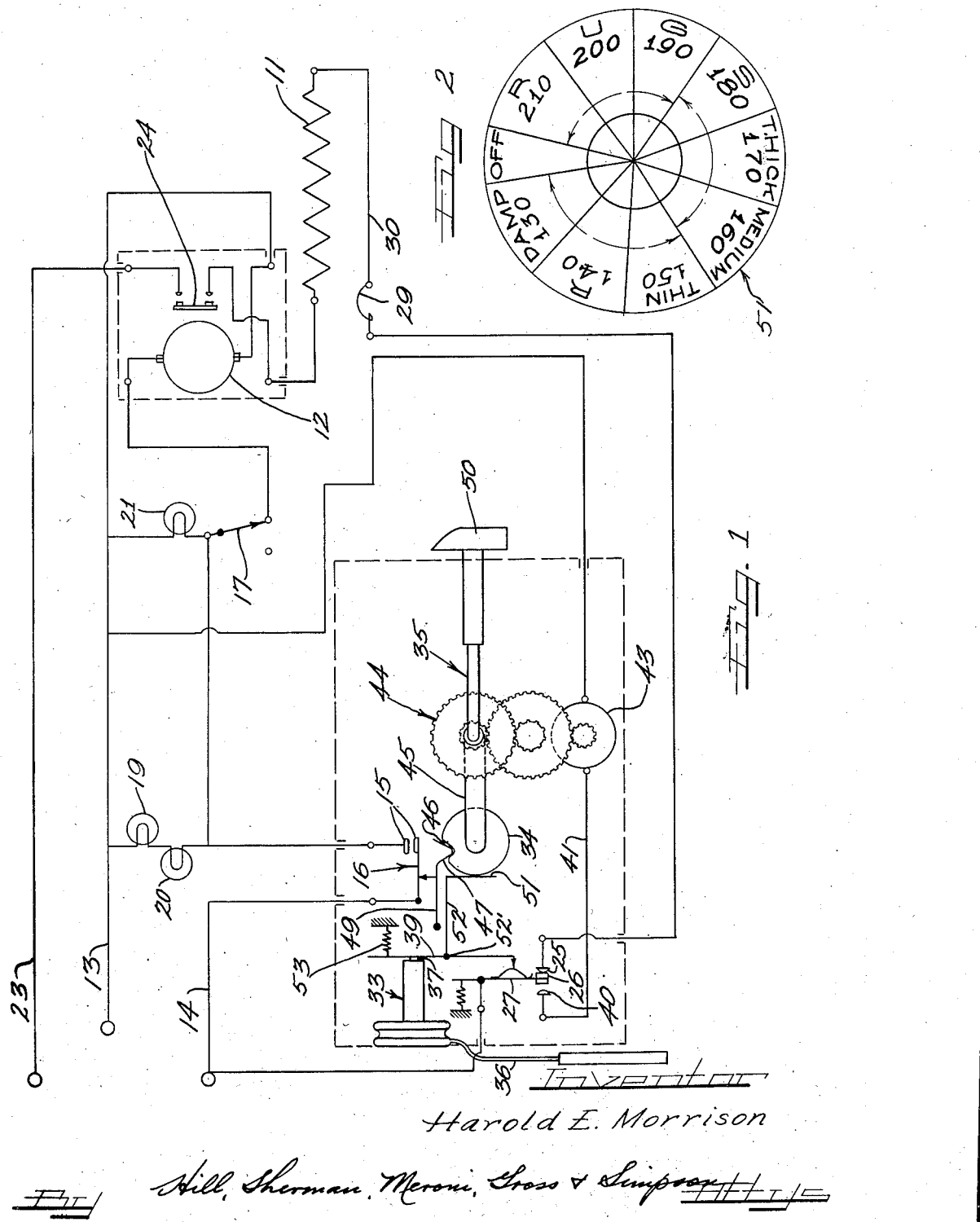

2,826,825

THERMOSTATIC CONTROL FOR CLOTHES DRIERS

Harold E. Morrison, Benton Harbor, Mich., assignor, by mesne assignments, to Whirlpool Corporation, a corporation of Delaware Application October 1, 1953, Serial No. 383,675

12 Claims. (Cl. 34—45)

This invention relates to improvements in control circuits for heating units and more particularly relates to circuit controlling heating by a succession of cooling cycles.

This invention is a continuation-in-part of my application Serial No. 267,769, filed January 23, 1952 now Patent No. 2,775,047.

A principal object of my invention is to provide a novel and improved form of cyclic control for a heating unit such as may be incorporated in an automatic clothes drier in which control heating is effected in accordance with the amount of moisture removed from the clothes.

A further object of my invention is to provide a novel and improved form of control for a heating unit, wherein a thermostatically operated switch connected in the energizing circuit for the heating unit operates during off cycles of the heating unit to control the temperature of heating.

Still another object of my invention is to provide a novel and improved form of heat control unit, utilizing a variable thermostat for controlling energization of a heating unit; the variable thermostat being set to open at a lower temperature by a motor operating when the thermostat has operated to deenergize the heating unit.

A still further object of my invention is to provide a simple and efficient control particularly adapted to control the heating of a household clothes drier and the like, wherein a control motor comes into operation upon a predetermined temperature rise within the drier and operates during a cooling cycle and sets the control circuit to deenergize the heating unit at successive lower temperatures.

A still further object of my invention is to provide a simple and efficient drier control including an adjustable thermostat controlling the temperature within the drier and a control motor set to operate upon operation of said thermostat, setting said thermostat to operate at a lower temperature during each period of operation of said motor.

A still further object of my invention is to provide a new and improved form of control circuit for a heating unit particularly adapted to control the operation of a household-type of clothes drier, wherein an electrically energized heating unit supplies heat to effect the drying of articles within the drum of the drier, a motor operated switch initially connects the heating unit in an electrical energizing circuit, and an adjustable thermostat disconnects the heating unit from the energizing circuit upon predetermined temperature rises, and connects the motor in the circuit to operate and set the thermostat to open at progressively lower temperatures.

Another and important object of my invention is to provide a simple and efficient control circuit for controlling the heating of a household-type clothes drier including an adjustable thermostat maintaining the heating unit for the drier in operation at temperatures below temperatures established by successive adjustments of the thermostat, and a control motor connected in the energizing circuit by said thermostat upon predetermined temperature rises and the deenergization of the heating unit, and operating to set the thermostat to open at successively lower temperatures during a cooling period of the drier.

Still another object of my invention is to provide a simple and efficient drier control including an adjustable thermostat, a motor controlled thereby and operating to set said thermostat to operate at a lower temperature setting when enough water has left the articles being dried to cause a temperature rise, the motor operating during the cooling cycle of the drier, and setting the thermostat to operate at a lower temperature setting to instigate a new heating cycle at a lower temperature than the preceding heating cycle.

These and other objects of my invention will appear from time to time as the following specification proceeds and with reference to the accompanying drawings wherein:

Figure 1 is a wiring diagram of a heat control circuit constructed in accordance with my invention, showing the control circuit connected to control the heating of a household-type of clothes drier; and Figure 2 is a plan view of a dial for the cycling timer, illustrating the temperature settings of the control for various types of clothes to be dried.

In the embodiment of my invention illustrated in the drawings, I have shown a drier control operable to control the energization of a heating unit 11 for a household-type of clothes drier. The heating unit 11 is shown as being an electric heating unit although it need not be an electric heating unit but may be a gas heating unit, in which case the control may control the energization of a solenoid controlling the opening and closing of a main valve controlling the supply of gas to the burner for the heating unit.

The drier circuit is also shown as including a drier motor 12 operable to rotatably drive a drier drum (not shown) for tumbling and drying clothes therein. The motor 12 is energized through main line conductors 13 and 14 and the movable and stationary contacts 15 of a cam operated switch 16. The cam-operated switch 16 is shown as being connected in the conductor 14 and closing to complete a circuit through said conductor to a door switch 17. The door switch 17 is also shown as being connected in conductor 14 and closes the circuit to motor 12 when the door is closed, to energize and start the motor 12 when the control knob is turned to an on position to complete a circuit through the contacts 15 of the cam operated switch 16. A germicidal lamp 19 and an illuminating lamp 20 for the interior of the drier drum are shown as being connected across the conductors 13 and 14, as is an indicator lamp 21 indicating when the timer has been turned to its on position.

The heating unit 11 is shown as being energized through an energizing circuit isolated from the circuit for operating the drier motor 12. As herein shown, a conductor 23 is connected with a relay 24, closing when the motor 12 attains a predetermined speed of rotation, to connect the heating unit 11 to be energized through a contact 25 and contact arm 26 of a thermostatically operated switch 27 connected with the heating unit 11 through a conductor 30.

The relay 24 is diagrammatically shown as being a centrifugal relay closing when the motor 12 reaches a predetermined speed of rotation, and encased within the casing for said motor. Such switches are well known to those skilled in the art and may be of various forms, so need only be shown diagrammatically herein.

The heating unit 11, therefore, can only be energized when the drier motor is up to speed, and the drier drum is sufficiently cool to allow the contact arm 26 to move to its biased position and close the circuit through the contact 25. A safety thermostat 29 is shown as being connected in the conductor 30. Said safety thermostat may be set to operate upon over-temperature conditions in case of failure of the thermostatic switch 27 to open.

The thermostatically operated switch 27 is shown as being operated by an adjustable thermostat 33 controlled by a cam 34 of a motor operated cyclic control 35. The thermostat 33 may be a well known form of diaphragm or bellows type of thermostat in which a capillary tube 36 subjected to the temperature of the air immediately adjacent the drier drum, is filled with a thermally expansible fluid to effect the extension of a plunger 37. The plunger 37 is diagrammatically shown as having engagement with an arm 39 and pivots said arm to open the circuit between the contact arm 26 and contact 25 of the thermostatically operated switch 27 upon predetermined rises in temperature and extensible movement of said plunger. Upon opening the circuit between the contact arm 26 and the contact 25, the contact arm 26 is moved by the thermostat 33 to close a circuit through a contact 40 connected with a conductor 41, to energize a control motor 43, to operate the control 35 when the heating unit 11 is deenergized.

The motor operated control 35 may be of a well known form, so need not herein be shown or described in detail and includes a reduction gear train 44 driven by the motor 43, to drive a cam shaft 45, to rotatably drive the cam 34, when the control motor 43 is energized. The cam 34 is shown as having a notch 46 recessed within the periphery thereof and engaging a follower surface 47 on the end of a pivoted operating arm 49 for the switch 16 when the cam 34 is in an off position.

When it is desired to initiate the operation of the drier circuit, to start the motor 12, and then energize the heating unit 11 when the motor 12 gets up to speed, a control knob 50 of the control 35 may be turned by the hand to bring the follower surface 47 out of engagement with the recess 46. This will close the switch 16 and complete a circuit through the contacts 15 of the switch 16 and energize the motor 12.

The cam 34 is shown as being mounted eccentric of the periphery thereof, forming an eccentric cam surface or periphery, engaging a follower 51 on the end of an arm 52, extending from a shifting pivot 52' on the operating arm 37 for the thermostatically operated switch 27. A spring 53 is diagrammatically shown as biasing the arm 39 about the shiftable pivot 52' into engagement with the plunger 37 of the thermostat 33, and the follower 51 into engagement with the cam 34.

The purpose of the cam surface 34 is to vary the setting of the thermostat 33 by shifting pivot 52' as said cam is rotated by the control motor 43. As, for example, the motor 43 is so geared to the shaft 45 as to rotate the cam 34 approximately 44° in three minutes time. This amount of rotation of the cam 34 will adjust the thermostat to lower the temperature of operation thereof 10°, it being understood that the cam 34 is rotated by the motor 43 when the circuit to the heating unit 11 is open. The thermostat 33 has a 20° differential, so that during this three minute period of rotation of the cam 34, the temperature of the air within the drier will have been reduced to 20° F. below the set temperature of the thermostat before the thermostat will allow the switch 27 to move to its biased position closing the heater circuit.

As, for example, assuming that the thermostat is set to open the circuit through the contact 25 at 210° as indicated on a dial 51 illustrated in Figure 2, the heat rise within the drier drum will be to a temperature of 210° F. When the temperature of the air within the drier reaches 210° F., the thermostat 33 will operate to open the circuit to the heater 11 through the contact 25 and deenergize the heater unit 11 and close a circuit through the contact 40 to energize the control motor 43. The cam 34 and knob 50 will then rotate toward the off position shown on the dial 51. In approximately three minutes time, the dial will have turned nearly one-eighth of a revolution. This amount of rotation of the cam 34 represents a reduction in the setting of the thermostat of about 10° F. The thermostat will then be set to open at 200° F., the temperature within the drier drum meanwhile will have been reduced to about 180° F. or 20° F. below the set temperature of the thermostat. The plunger 37 of the thermostat 33 having released the arm 39, the contact arm 26 will move to its biased position to break the circuit through the contact 40 and deenergize the motor 43 and complete a circuit through the contact 25 and energize the heating unit 11. Heat will then be applied to dry the clothes and evaporate more water therefrom. As the temperature within the drier drum rises from 180° F. to 200° F., the circuit through the contact 25 will again be opened and a circuit will be established through the contact 40 to again start operation of the motor 43 to operate the cam 34 for about another eighth of a revolution and reduce the setting of the thermostat to approximately 190° F., while the temperature within the drier drum reduces to about 170° F. prior to the stopping of said control motor by the opening of the circuit through the contact 40 under control of the thermostat 33. Although a period of three minutes has been used as an example of the period of operation of the control on each occasion of energization thereof, it will be readily observed from the foregoing that the actual period of energization of the control motor 43, during each cycle, is determined by the rate of heat loss or temperature drop in the drier drum. That is, when the temperature rises to the set temperature of the thermostat, the heater 11 will be de-energized and the control motor will be energized. Then the temperature in the drier drum will drop while the thermostat is also being set to a lower temperature. When the temperature in the drier drum drops to about 20° F. below the new set temperature of the thermostat, which set temperature is continuously being reduced while the control motor is running, the control circuit through the control 25 will be opened and the heating portion of the cycle will begin. Thus, the cooling and temperature resetting portion of each cycle of operation has a period which is determined by the rate of temperature drop in the drier drum and the rate of reduction of the set temperature of the thermostat.

Under ordinary conditions each cycle will have about a three minute cooling period during which the set temperature will be reduced about 10°. It should be noted, however, that this period will vary as the clothes in the drier drum are dried and as the moisture is dried or evaporated therefrom. Further, the period will vary from cycle to cycle as well as vary from drying operation to drying operation, depending upon the rate of drying and the particular materials which are being dried.

The cyclic operation of the control and heater will continue in the described manner until the cam 34 has been rotated to an off position, at which time the follower 47 will drop into engagement with the recess or notch 46 in the cam 33 and the circuit through the contacts 15 will be broken, deenergizing the drier motor 12. As the drier motor 12 slows down the relay 24 will open and the heating element 11 will be further disconnected from the circuit, the heating element 11 also having been deenergized by operation of the thermostat 33. By operation of the cycling control system of this invention the temperature within the drier drum will have been reduced to approximately 110° at the end of the drying operation.

It may be seen from the foregoing that a simplified and improved control circuit for an electrically operated or controlled heating element has been provided, in which the drying is controlled by the off or cooling cycles of the articles being heated or dried and that when the circuit is used for a clothes drier to control the drying operation thereof, the cooling cycles are selected depending upon the thickness and difficulty of drying the particular articles within the drier drum. That is, heavy rugs may require as many as eight cooling cycles, while articles made of rayon may only require one cooling cycle.

It may further be seen that the heating unit is isolated from the circuit to the motor for driving the drier drum and the circuit for operating the control motor and is held from being energized until the drier drum comes up to the required speed and is deenergized if at any time the drive motor should slow down below the speed required to hold the relay 24 closed.

It may still further be seen that a novel and improved form of drier control has been provided which is particularly adapted for controlling the drying operation of a clothes drier, but which may also be adapted for controlling various heating operations, and that when controlling the operation of a clothes drier the guessing of the time required to dry the load in question has been eliminated. The reason for this is that the control motor is operated solely under control of the cycling thermostat and only comes into operation when the temperature within the drier cabinet is hot enough to cause the thermostat to open the circuit to the heating element, or deenergize the solenoid for a main burner valve, if the drier should be a gas drier, and then rotate the control cam in an off direction, and at the same time lower the temperature at which the thermostat opens for the next successive drying operation.

It will be understood that various modifications and variations of the present invention may be effected without departing from the spirit and scope of the novel concepts thereof.

I claim as my invention:

1. A control circuit particularly adapted to effect a succession of heating and cooling cycles, comprising an adjustable thermostat, a motor operably coupled to the thermostat to change the setting thereof, a heater coupled to said thermostat to be controllably actuated and deactuated thereby a switch operated by said thermostat and having separate contacts, one being connectable to effect a heating operation and the other being connectable to effect operation of said motor, said switch disconnecting the heating operation upon predetermined temperature rises and energizing said motor to operate when the heat is off.

2. In a control circuit controlling heating by a cooling cycle, a control motor, an adjustable thermostat coupled to said motor, said motor effecting adjustment of said thermostat upon operation of said motor, a source of heat, a switch operated by said thermostat, said switch being connected to alternately energize said source of heat and energize said control motor, and being operated by said thermostat to deenergize said source of heat and energize said control motor to operate upon predetermined temperature rises to readjust said thermostat to successively different temperatures during cooling cycles.

3. In a control circuit for controlling heating by a succession of cooling cycles, an adjustable thermostat, a motor coupled to said thermostat and to control the setting of said thermostat for operation thereof at a lower temperature during each successive period of operation of said motor, a source of heat, a switch operated by said thermostat to deenergize a source of heat at predetermined temperature conditions and to start said motor when the source of heat is deenergized to initiate a cooling cycle for adjustment of said thermostat to operate at a lower temperature setting whereby a succeeding heating cycle is initiated at a lower temperature than the preceeding heating cycle.

4. In a control circuit for controlling heating by a succession of cooling cycles, a motor, a cam operated by said motor, an adjustable thermostat connected with said cam and set by said cam to operate at successively lower temperature settings from the initial temperature setting of said thermostat, a heating unit, an energizing circuit for said heating unit including a switch closed upon the setting of said motor to an on position and a second switch in series with said first switch opened by said thermostat upon a predetermined temperature rise within the drier to deenergize said heating unit, said second switch having a contact for energizing said motor and completing an energizing circuit to said motor upon deenergization of said heating unit, to effect operation of said cam to initiate a cooling cycle and set said thermostat to operate at a lower temperature.

5. In a control circuit for controlling heating by a succession of cooling cycles, an electrically energizable heating unit, a cam and a motor for operating the cam, an adjustable thermostat, means coupling said cam to said thermostat for varying the temperature setting of said thermostat during a cooling cycle, an energizing circuit for said heating unit electrically isolating said heating unit from said motor and including a switch operated by said thermostat and having a contact arm and two contacts, one of said contacts being connected in said energizing circuit for said heating unit and the other of said contacts being connected in an energizing circuit for said motor, and said switch arm being biased into engagement with said one contact to close said energizing circuit for said heating unit and being moved against its bias into engagement with the other of said contacts by operation of said thermostat at the temperature setting thereof, to deenergize said energizing circuit for said heating unit and energize said motor to effect operation of said motor during a cooling cycle to adjust said thermostat to operate at a lower temperature setting.

6. In a control circuit for controlling heating by a succession of cooling cycles, a motor, a cam operated by said motor, a switch operated by said cam to close a main energizing circuit, an adjustable thermostat, means coupling said cam to said thermostat to adjust said thermostat to operate at successively lower temperatures upon rotation of said cam from an on to an off position, a heating unit, an energizing circuit for said heating unit through said switch and electrically isolated from said motor, a second switch having a contact arm and two contacts, one of said contacts completing a circuit to said main energizing circuit for said heating unit and the other of said contacts completing a circuit through said motor upon deenergization of said energizing circuit for said heating unit, means biasing said switch arm into engagement with said one contact to energize said heating unit, and an operative connection between said thermostat and said switch arm moving said contact arm out of engagement with said one contact into engagement with said other contact upon a temperature rise to the setting of said thermostat, to effect operation of said motor upon deenergization of said energizing circuit for said heating unit and thereby operate said cam to change the temperature setting of said thermostat to a lower temperature setting.

7. In a clothes drier, a motor for operating the drier, a heating unit, an energizing circuit for said drier motor, a control and energizing circuit for said heating element electrically isolated from said drier motor circuit for controlling the drying operation in accordance with a succession of cooling cycles, a control motor, a cam operated thereby and a switch closed upon movement of said cam to an on position connecting said drier motor in the energizing circuit, a thermostatically operated switch, a relay operated by said drier motor to close upon the attaining of said motor of a predetermined speed of rotation, said relay upon operation connecting said heating unit in its control and energizing circuit, and a thermostat for operating said second switch to deenergize said heating unit and energize said control motor to effect a cooling cycle, said cam lowering the temperature setting of said thermostat upon each cycle of operation of said cam as said cam is rotated from an on to an off control position thereof.

8. In a clothes drier, a control circuit therefor operable to control the drying operation in accordance with a succession of cooling cycles, a motor for operating the drier, an energizing circuit for said motor including a cam, a switch operated by said cam and closed upon movement of said cam to an on position, a heating unit, an energizing circuit for said heating unit electrically isolated from the energizing circuit for said drier motor and including a thermostatically operated switch normally biased in position to energize said heating unit, and a centrifugal switch operated by said drier motor and closing upon the attaining of said drier motor of a predetermined speed of rotation, a control motor for operating said cam, an energizing circuit for said control motor electrically isolated from said energizing circuit for said heating unit and including said thermostatically operated switch, and a thermostat for operating said switch when the temperature within said drier reaches the set temperature of the thermostat to deenergize said energizing circuit for said heating unit and close said energizing circuit for said control motor thereby to effect rotation of said cam from an on to an off control position, said cam successively lowering the temperature setting of said thermostat upon movement of the cam from an on to off control position.

9. In a drier control circuit operable to control the drying operation of a clothes drier having a drier drum and a drive motor therefor in accordance with a succession of cooling cycles, a heating unit, a cyclic control including a control motor, a cam rotatably driven thereby, a switch operated by said cam to complete a main energizing circuit, an adjustable thermostat, a switch operated thereby and normally biased in a closed position to complete an energizing circuit to said heating unit, said thermostatically operated switch having a second position completing a circuit to said control motor for energizing the same when the temperature within the drier drum reaches the temperature of the setting of said thermostat, said cam lowering the temperature setting of said thermostat upon rotaion of the cam from an on towards an off position, and the energizing circuit to said heating unit also including a relay opening when the speed of rotation of said drier motor is reduced below a predetermined safe speed of rotation.

10. In a drier control circuit operable to control the drying operation of clothes driers in accordance with a succession of cooling cycles, a drive motor for the drier, a heating unit, a cyclic control including a cam, a switch operated thereby and closing when said cam is turned to an on position, a control motor for operating said cam, an energizing circuit for said drier motor through the contacts of said switch, an energizing circuit for said heating unit including a centrifugal switch closing its contacts upon the attaining of a predetermined speed of rotation by said drive motor, an adjustable thermostat, a switch operated by said thermostat normally biased in a closed position to energize said heating unit, said switch having a second position opening the circuit to said heating unit and closing an energizing circuit to said control motor when the temperature within the drier drum attains the temperature for which said thermostat is set, and means coupling said cam to said thermostat to lower the setting thereof upon rotation of said cam toward an off position, to effect a series of cooling cycles each at lower temperature.

11. A control circuit particularly adapted to effect a succession of heating and cooling cycles, comprising an adjustable thermostat, a motor operatively coupled to the thermostat to change the setting thereof, a heater, and circuit means including a switch controlled by said thermostat to alternately energize said motor and said heater to operate and vary the setting of said thermostat to successively different temperatures upon predetermined temperature rises.

12. In a control circuit for a heating unit, a motor means, a switch to control alternate energization of the heating unit and the motor means, a thermostat controlling opening and closing of said switch, and a cam coupled to said thermostat, said cam being driven by said motor means to cyclically and periodically reset the thermostat whereby the switch will be moved at progressively lower temperatures.

References Cited in the file of this patent
UNITED STATES PATENTS

| | | |
|---|---|---|
| 1,490,569 | Krick | Apr. 15, 1924 |
| 1,583,376 | Welch | May 4, 1926 |
| 2,104,972 | Cunningham | Jan. 11, 1938 |
| 2,332,639 | Hudson | Oct. 26, 1943 |
| 2,486,315 | Morris | Oct. 25, 1949 |
| 2,505,041 | Gorsuch | Apr. 25, 1950 |
| 2,577,104 | Butler | Dec. 4, 1951 |
| 2,621,423 | Clark | Dec. 16, 1952 |
| 2,654,961 | Manecke | Oct. 13, 1953 |